US012673293B2

(12) United States Patent
Schnoor et al.

(10) Patent No.: US 12,673,293 B2
(45) Date of Patent: Jul. 7, 2026

(54) CHILLED AMMONIA-BASED CARBON DIOXIDE ABATEMENT SYSTEM WITH STACKED SECTIONS

(71) Applicant: NUOVO PIGNONE TECNOLOGIE—S.R.L., Florence (IT)

(72) Inventors: Birger Schnoor, Frankfurt (DE); Jochen Bildesheim, Frankfurt (DE); Christoph Weingartner, Frankfurt (DE)

(73) Assignee: Nuovo Pignone Tecnologie—S.R.L, Florence (IT)

( * ) Notice: Subject to any disclaimer, the term of this patent is extended or adjusted under 35 U.S.C. 154(b) by 321 days.

(21) Appl. No.: 18/549,071

(22) PCT Filed: Mar. 9, 2022

(86) PCT No.: PCT/EP2022/025094
§ 371 (c)(1),
(2) Date: Sep. 5, 2023

(87) PCT Pub. No.: WO2022/189039
PCT Pub. Date: Sep. 15, 2022

(65) Prior Publication Data
US 2024/0149211 A1 May 9, 2024

(30) Foreign Application Priority Data
Mar. 10, 2021 (IT) ........................ 102021000005585

(51) Int. Cl.
*B01D 53/14* (2006.01)
*B01D 53/18* (2006.01)

(52) U.S. Cl.
CPC ..... *B01D 53/1475* (2013.01); *B01D 53/1425* (2013.01); *B01D 53/1493* (2013.01); *B01D 53/18* (2013.01); B01D 2252/102 (2013.01); B01D 2257/504 (2013.01); B01D 2258/0283 (2013.01)

(58) Field of Classification Search
CPC .............. B01D 53/1425; B01D 5/0027; B01D 53/1475; B01D 53/1493; B01D 53/18; B01D 2252/102; B01D 2257/504; B01D 2258/0283; B01D 53/1418; Y02C 20/40
See application file for complete search history.

(56) References Cited

U.S. PATENT DOCUMENTS

| | | | | |
|---|---|---|---|---|
| 3,985,863 A | * | 10/1976 | Rice | ......................... C01C 1/12 |
| | | | | 423/238 |
| 4,035,166 A | * | 7/1977 | Van Hecke | ........ B01D 53/1425 |
| | | | | 423/232 |

(Continued)

FOREIGN PATENT DOCUMENTS

| | | |
|---|---|---|
| CN | 101318651 A | 12/2008 |
| CN | 103857457 A | 6/2014 |

(Continued)

*Primary Examiner* — Stephen Hobson
(74) *Attorney, Agent, or Firm* — Paul Frank + Collins P.C.

(57) ABSTRACT

In an ammonia-based carbon dioxide capturing system sections of the system are stacked to form a single column and save civil works, footprint and components. Specifically, an ammonia regenerator, a carbon dioxide water wash section and an ammonia stripper are stacked to form a single column.

18 Claims, 1 Drawing Sheet

(56)  References Cited

U.S. PATENT DOCUMENTS

| | | | | |
|---|---|---|---|---|
| 6,139,605 | A * | 10/2000 | Carnell | B01D 53/1425 95/169 |
| 6,174,348 | B1 * | 1/2001 | Ahmed | B01D 53/1425 95/163 |
| 8,986,640 | B1 * | 3/2015 | Dube | B01D 53/1425 423/237 |
| 9,216,380 | B1 * | 12/2015 | Augustsson | B01D 53/62 |
| 10,005,021 | B1 * | 6/2018 | Dube | C01C 1/12 |
| 2005/0000360 | A1 * | 1/2005 | Mak | C10L 3/10 95/236 |
| 2008/0184887 | A1 * | 8/2008 | Mak | B01D 53/1425 95/174 |
| 2011/0278152 | A1 * | 11/2011 | Ungar | C01C 1/024 202/184 |
| 2011/0288184 | A1 * | 11/2011 | Nardo | E04H 5/02 423/239.1 |
| 2012/0073441 | A1 * | 3/2012 | Mak | C10L 3/102 62/636 |
| 2012/0180521 | A1 * | 7/2012 | Erickson | B01D 53/62 96/242 |
| 2012/0195816 | A1 * | 8/2012 | Dube | B01D 53/75 423/220 |
| 2013/0092026 | A1 * | 4/2013 | Dube | B01D 61/025 96/240 |
| 2013/0125747 | A1 * | 5/2013 | Dube | B01D 53/1475 96/201 |
| 2013/0175004 | A1 * | 7/2013 | Dube | F23J 15/04 165/104.11 |
| 2013/0186272 | A1 * | 7/2013 | Balfe | B01D 53/58 95/228 |
| 2015/0027310 | A1 * | 1/2015 | Augustsson | B01D 53/1493 95/166 |
| 2015/0059573 | A1 * | 3/2015 | Filippi | B01D 53/0462 96/127 |
| 2015/0166915 | A1 * | 6/2015 | Mak | B01D 53/1425 95/94 |
| 2015/0316259 | A1 * | 11/2015 | Schöneberger | B01D 53/18 96/323 |
| 2015/0342274 | A1 | 12/2015 | Augustsson | |
| 2015/0343374 | A1 * | 12/2015 | Augustsson | B01D 53/62 423/220 |
| 2016/0184768 | A1 * | 6/2016 | Bagajewicz | C10L 3/105 95/166 |
| 2016/0263522 | A1 * | 9/2016 | Vera-Castañeda | B01D 53/78 |
| 2016/0288050 | A1 * | 10/2016 | Dube | C25B 9/19 |
| 2016/0289080 | A1 * | 10/2016 | Dube | B01D 53/96 |
| 2018/0169569 | A1 * | 6/2018 | Dube | F28C 1/003 |
| 2018/0178160 | A1 * | 6/2018 | Dube | B01D 53/1425 |
| 2019/0178574 | A1 * | 6/2019 | Naito | B01D 53/0462 |
| 2021/0363443 | A1 * | 11/2021 | Arumugam | B01D 53/1425 |
| 2023/0356143 | A1 * | 11/2023 | Stallmann | B01D 53/62 |
| 2026/0054218 | A1 * | 2/2026 | Holtzapple | B01D 53/75 |

FOREIGN PATENT DOCUMENTS

| | | | | |
|---|---|---|---|---|
| CN | 104066494 A | 9/2014 | | |
| CN | 203877925 U | 10/2014 | | |
| CN | 104338418 A | 2/2015 | | |
| CN | 107754562 A | 3/2018 | | |
| EP | 2829311 A1 | 1/2015 | | |
| EP | 3075430 A1 | 10/2016 | | |
| GB | 1169175 A | 10/1969 | | |
| WO | 2009/025003 A2 | 2/2009 | | |
| WO | WO-2009063041 A1 * | 5/2009 | | B01D 53/78 |
| WO | WO-2017067638 A1 * | 4/2017 | | C10K 1/08 |
| WO | WO-2018108588 A1 * | 6/2018 | | B01D 53/62 |

* cited by examiner

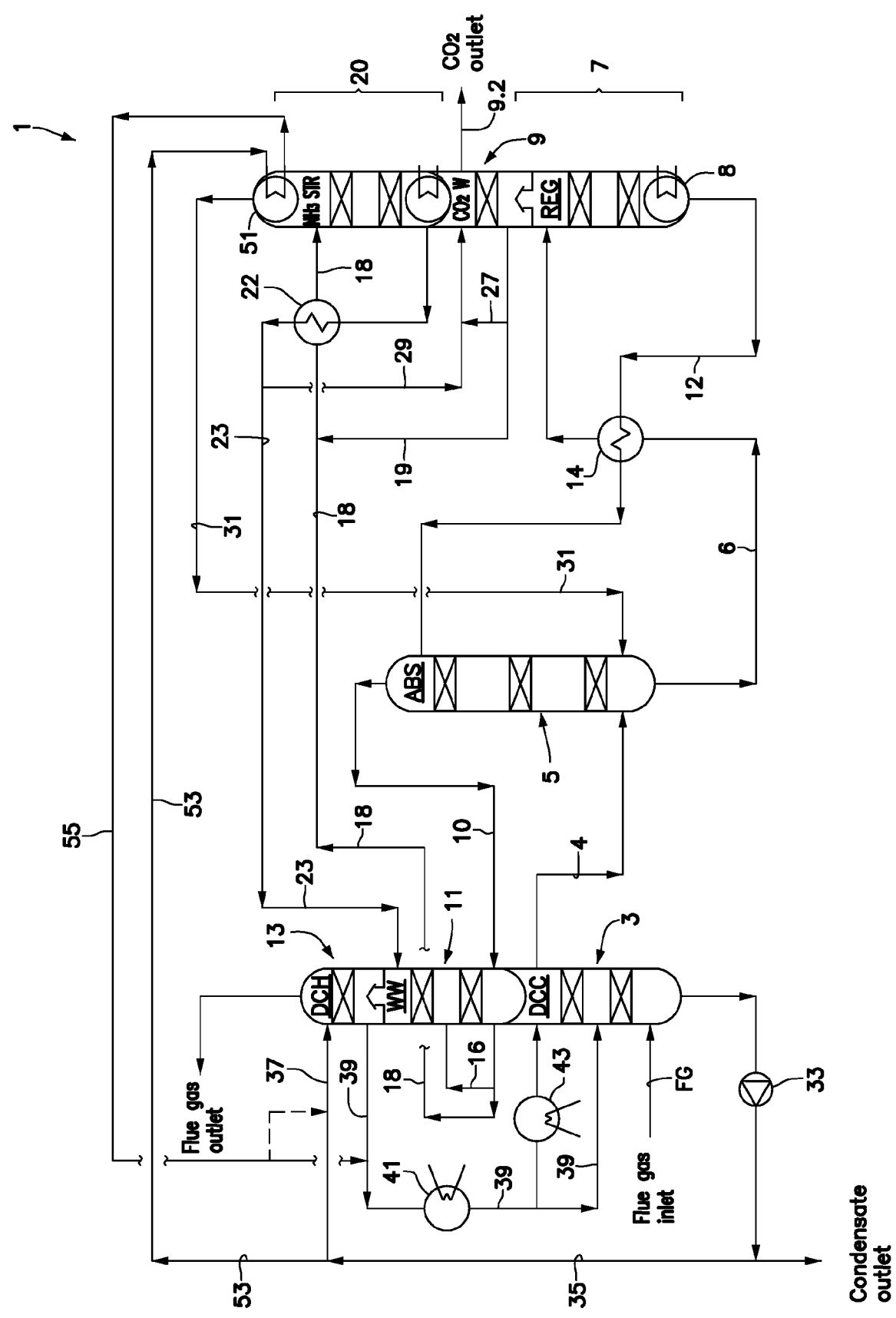

CHILLED AMMONIA-BASED CARBON DIOXIDE ABATEMENT SYSTEM WITH STACKED SECTIONS

TECHNICAL FIELD

Embodiments of the invention relate generally to technologies for reducing carbon dioxide emissions from flue gas or other sources of carbon dioxide, and more specifically to systems and methods for ammonia-based carbon dioxide abatement, i.e. for removing carbon dioxide from flue gas.

BACKGROUND ART

Most of the energy used in the world is derived from combustion of carbon and hydrogen containing fuels such as coal, oil and natural gas (fossil fuels). In addition to carbon and hydrogen, these fuels contain oxygen, moisture and contaminants such as ash, sulfur (often in the form of sulfur oxides, referred to as SOX), nitrogen compounds (often in the form of nitrogen oxides, referred to as NOR), chlorine, mercury and other trace elements.

Awareness regarding the damaging effects of contaminants released in the atmosphere during combustion triggered the enforcement of increasingly more stringent limits on emissions from power plants, refineries and other industrial processes. There is an increased pressure on operators of such plant to achieve near zero emission of contaminants.

In the combustion of fuel, such as e.g. coal, oil, peat, waste, biofuel, natural gas or the like, used for the power generation or for the production of materials such as cement, steel and glass, steam, heating media and hydrogen, and the like, a stream of hot flue gas is generated. The hot flue gas contains, among other pollutants, large amounts of carbon dioxide ($CO_2$), which is responsible for the so-called greenhouse effect and related global temperature increase.

Numerous systems and processes have been developed aimed at reducing the emission of contaminants. These systems and processes include, but are not limited, to desulfurization systems, particulate filters, as well as use of one or more sorbents that absorb contaminants from the flue gas. Examples of sorbents include, but are not limited to, activated carbon, ammonia, limestone and the like.

It has been shown that ammonia efficiently removes carbon dioxide as well as other contaminants, such as sulfur dioxide and hydrogen chloride, from flue gas streams. In one particular application, absorption and removal of carbon dioxide from a flue gas stream with ammonia is conducted at low temperature, for example between 0 and 20° C. These systems are based on a so-called Chilled Ammonia Process (shortly CAP). To safeguard the efficiency of the system and to comply with emission standards, retention of the ammonia within the flue gas stream treatment system is desired, i.e. no ammonia shall be released in the atmosphere.

In CAP systems of the current art, after $CO_2$ has been removed from the flue gas stream in a carbon dioxide absorber, the flue gas contains a major amount of ammonia that is emanating from the solvent used in the carbon dioxide absorber. To limit ammonia losses the CAP technology features a so-called ammonia wash section ($NH_3$ wash), also referred to as ammonia water wash section. The ammonia water wash section or $NH_3$ wash section includes a packed bed column, where the flue gas is directly contacted with a water stream. The ammonia-rich water exiting the $NH_3$ water wash section is then regenerated in a dedicated column system, the stripper column, where water and ammonia are separated. The water is routed back to the $NH_3$ water wash section, the ammonia is recycled back to the carbon dioxide absorber.

The direct contact heater is another column that heats the flue gas flowing out of the $NH_3$ water wash section. This has two effects: generation of a cold-water stream that is used in the direct contact cooler; and heating of the flue gas to the minimum temperature required for the dispersion thereof at the stack. The water fed to the direct contact heater is coming from the direct contact cooler.

The current CAP technology is still open to further developments to achieve improved efficiency, for instance in terms of reduction of space required and number of components of the system or plant or reduction of investment cost.

SUMMARY

A chilled ammonia-based carbon dioxide removal system is disclosed herein, which includes a direct contact cooler adapted to receive and cool a flue gas containing gaseous carbon dioxide. The system further comprises a carbon dioxide absorber disposed downstream of the direct contact cooler and fluidly coupled thereto. The carbon dioxide absorber is adapted to receive cooled flue gas from the direct contact cooler and absorb the gaseous carbon dioxide from the flue gas via an ammonia-based $CO_2$-lean solution to form an ammonia-based $CO_2$-rich solution stream and a $CO_2$-lean flue gas stream. The system further comprises an ammonia water wash section, fluidly coupled to the absorber and adapted to receive the of $CO_2$-lean flue gas stream from the absorber and to absorb ammonia slip from the flue gas via a washing solution and form an ammonia-rich water stream. The system further comprises a direct contact heater fluidly coupled to the ammonia water wash section, to receive therefrom the $CO_2$-lean, ammonia-lean flue gas stream and heat the flue gas stream.

A regenerator is fluidly coupled to the absorber and adapted to receive the ammonia-based $CO_2$-rich solution stream from the absorber, release $CO_2$ from the ammonia-based $CO_2$-rich solution stream and return ammonia-based $CO_2$-lean solution to the absorber. A $CO_2$ water wash section is adapted to receive gaseous carbon dioxide from the regenerator and absorb ammonia from the carbon dioxide stream via a washing solution and form an ammonia-rich water stream. An ammonia stripper is further provided, which is adapted to receive the ammonia-rich water stream from the $CO_2$ water wash section and from the ammonia water wash section and to remove ammonia from the ammonia-rich water streams and to return ammonia to the absorber and ammonia-lean washing solution to the $CO_2$ water wash section and to the ammonia water wash section. To reduce the overall dimension and footprint of the system as well as the pieces of equipment required, the regenerator, the $CO_2$ water wash section and the ammonia stripper are stacked in a single column.

In currently preferred embodiments, the $CO_2$ water wash section is disposed between the regenerator and the ammonia stripper, the regenerator being disposed in the lower portion of the column and the ammonia stripper being disposed in the upper portion of the column. Other stacking sequences are not ruled out, however.

In order to further reduce the overall footprint of the system and the number of components, in some embodiments the direct contact cooler, the ammonia water wash section and the direct contact heater can be in turn stacked in a single column. For instance, the ammonia water wash section can be disposed between the direct contact cooler and the direct contact heater and the direct contact cooler can be disposed at the bottom of the column.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 is a schematic diagram of an ammonia-based carbon dioxide removal system according to the present disclosure using a chilled ammonia process (CAP).

DETAILED DESCRIPTION

Disclosed herein are improvements to systems for removing or abating carbon dioxide contained in a flow of flue gas, using an ammonia-based technology. In order to reduce the total number of components and the overall footprint of the system, some of the sections thereof are stacked to form a single column. In embodiments disclosed herein, the ammonia regenerator, the carbon dioxide water wash section and the ammonia stripper are stacked one on top of the other to form a single column. This novel stacking arrangement has further benefits in terms of reduction of civil works, in particular reduced foundation work, with an overall reduced investment cost.

In order to optimize the mutual position between the stacked sections and provide efficient fluid coupling therebetween, in some embodiments the ammonia stripper is placed on top of the column, the regenerator at the bottom of the column and the carbon dioxide water wash section in an intermediate position, between the ammonia stripper and the regenerator. Arranging the $CO_2$ water wash section in a position higher than the regenerator is consistent with gas flow, which is from the bottom regenerator to the top carbon dioxide water wash section. Moreover, the ammonia regenerator has often larger dimensions and weight than the ammonia stripper. It is therefore preferred to place the ammonia regenerator at the bottom of the column for mechanical/static reasons.

Moreover, the hydraulic head required to pump the carbon dioxide rich solution from the absorber to the regenerator is minimized if the regenerator is arranged at the bottom of the column. Arranging the ammonia stripper and relevant overhead condenser at the top of the column provides advantages in terms of installation and removal for maintenance and cleaning purposes, for instance.

Different layouts are not ruled out, however. For instance, the ammonia stripper can be arranged at the bottom of the column, the regenerator in an intermediate position and the carbon dioxide water wash section on top of the column. This arrangement may have the advantage that liquid flow from the carbon dioxide water wash section towards the ammonia stripper may in some embodiments allow gravity flow, and therefore result in saving the related pumps.

Turning now to the drawings, a schematic diagram of a chilled ammonia-based $CO_2$ capturing or abatement system 1 according to embodiments of the present disclosure is shown in FIG. 1.

The system 1 comprises a direct contact cooler 3, wherein an incoming $CO_2$-rich flue gas stream FG is chilled prior to be fed through a line 4 to a carbon dioxide absorber 5 fluidly coupled to the direct contact cooler 3. In the carbon dioxide absorber 5, $CO_2$ contained in the flue gas is removed from the flue gas by absorption through an ammonia water solution flowing in counter-current flow with the flue gas. Ammonia-rich and $CO_2$-lean flue gas exits the carbon dioxide absorber 5 at the top and an ammonia-based $CO_2$-rich solution stream, i.e. a $CO_2$-rich ammonia water solution, is collected at the bottom of the absorber 5.

The $CO_2$-rich ammonia water solution collected at the bottom of the absorber 5 is delivered through line 6 to a regenerator 7, where carbon dioxide is removed from the $CO_2$-rich ammonia water solution collected at the bottom of the absorber 5 by heating provided by a heat exchanger 8.

A flow of carbon dioxide exiting the regenerator 7 still contains ammonia and is delivered through a $CO_2$ water wash section 9, fluidly coupled to the regenerator 7 and adapted to receive carbon dioxide from the regenerator 7 to remove residual ammonia therefrom, prior to discharging the carbon dioxide from the system through a carbon dioxide outlet 9.2.

The ammonia-rich and $CO_2$-lean solution resulting from the release of carbon dioxide in the regenerator 7 is returned through a line 12 from the bottom of the regenerator 7 to the absorber 5 via a heat exchanger 14 aimed at recovering heat from the regenerator 7. In the heat exchanger 14 heat is removed from the ammonia-rich solution arriving from the bottom of the regenerator 7 and used to pre-heat the $CO_2$-rich solution flowing from the bottom of the absorber 5 through line 6 towards the regenerator 7.

The $CO_2$-lean, ammonia-rich flue gas exiting at the top of the carbon dioxide absorber 5 is delivered through a line 10 to an ammonia water wash section 11 (or $NH_3$ wash section), where the major part of the ammonia slipped with the flue gas from the absorber 5 is removed from the flue gas by flowing the flue gas stream through the ammonia water wash section 11 in countercurrent flow with ammonia-lean wash water from an ammonia stripper 20. The $CO_2$-lean, ammonia-lean flue gas stream is then delivered to the direct contact heater 13 and heated prior to be delivered to a stack (not shown) to be discharged to the atmosphere.

An ammonia-rich water stream is collected at the bottom of the ammonia water wash section 11. Part of the ammonia-rich water stream is recirculated in the ammonia water wash section 11 (line 16) and in part delivered to an ammonia stripper 20 through line 18. Along the line 18 a heat exchanger 21 is arranged, wherein ammonia-rich water from the ammonia water wash section 11 exchanges heat against a flow of ammonia-lean water from the bottom of the ammonia stripper 20.

A return line 23 returns water from the bottom of the ammonia stripper 20 to the top of the ammonia water wash section 11.

In addition to ammonia-rich water from the ammonia water wash section, the ammonia stripper 20 receives a flow of ammonia-rich water from the bottom of the $CO_2$ water wash section 9 through line 19. Part of the water collecting at the bottom of the $CO_2$ water wash section 9 is recirculated (line 27) through the $CO_2$ water wash section while clean water from line 23 partly flows (line 29) to the top of the $CO_2$ water wash section 9.

Ammonia collecting at the top of the ammonia stripper 20, after water condensation, is returned through line 31 to the bottom of the absorber 5.

Hot water circulating in the direct contact heater 13 from the top to the bottom in counter-current flow with respect to the ammonia-lean and $CO_2$-lean flue gas transfers heat to the flue gas such that the latter reaches a temperature suitable for discharging flue gas in the environment. The hot water flowing in the direct contact heater 13 for flue gas heating is fed by a water pump 33 arranged to pump water collected at the bottom of the direct contact cooler 3 after the water has cooled the incoming flue gas FG.

Water is pumped by the water pump 33 towards the top of the direct contact heater 13 through a lifting line 35. A connecting line 37 fluidly couples the lifting line 35 to the top of the direct contact heater 13, wherefrom hot water flows downwards in counter-current flow with respect to the $CO_2$-lean, ammonia-lean flue gas.

Water which has been partly cooled in the direct contact heater by heat exchange with the flue gas is collected at the bottom of the direct contact heater 13 and returned to the direct contact cooler 3 through line 39. In the embodiment of FIG. 1, the descending water flow is cooled in a first water cooler 41, for instance a cooling tower, prior to be fed to an intermediate section of the direct contact cooler 3. Part of the water flowing through line 39 and water cooler 41 is further cooled in a second water cooler 43 prior to be fed through a line 45 to the top of the direct contact cooler 3.

To condense water released from the ammonia-rich water solution processed in the ammonia stripper 20, a condenser 51 is provided at the top of the ammonia stripper 20. In a particularly advantageous and novel approach, the cold side of the condenser 51 is adapted to circulate water from the bottom of the direct contact cooler 3. Specifically, as shown in FIG. 1, the inlet of the cold side of condenser 51 is fluidly coupled via a cooling water inlet line 53 which is directly fluidly connected to line 35, through which water pumped from the bottom of the direct contact cooler 3 by the water pump 33 is returned to the top of the direct contact heater 13. The outlet of the cold side of condenser 51 is fluidly coupled via line 55 with the line 39 that connects the direct contact heater 13 with the direct contact cooler 3.

Alternatively, as shown in dotted line, the water outlet from condenser 51 can be fluidly coupled to line 37, which leads to the top of the direct contact heater 13.

The temperature of the water collected at the bottom of the direct contact cooler 3 is higher than a usual source of cooling water available in the system 1 and usually utilized to condense steam at the top of the ammonia stripper 20. The temperature of the water at the bottom of the direct contact cooler 3 is, however, sufficiently low to condense water and return the latter to ammonia stripper 20, while ammonia is returned to the absorber (line 31).

Using water from the bottom of the direct contact cooler 3 to condense water at the top of the ammonia stripper 20 has several advantages over other approaches to water condensation used in ammonia-based $CO_2$-recovery plants of the prior art.

Firstly, the water pump 33 provided at the bottom of the direct contact cooler 3 is a high-hydraulic head pump, adapted to reach the top of the direct contact heater 13. The hydraulic head of said pump is sufficient to reach the top of the ammonia stripper 20. The same pump 33 can thus be used for two different functions, avoiding the need for an additional, high-hydraulic head pump for pumping cooling water to the condenser at the top of the ammonia stripper 20. Reducing the number of pumps in the system 1 is advantageous both from the point of view of the cost of the plant, as well as from the point of view of reduction of maintenance costs and risks of plant stoppage due to machine failure.

Moreover, using partly heated water from the direct contact cooler 3 as a cooling medium to condense water at the top of the ammonia stripper 20 avoids (too) high cooling water return temperature at reduced capacity or clean heat exchanger condition, when only a partial cooling water stream is routed to the condenser. High cooling water return temperatures are undesirable due to increased fouling tendency and potential construction material limits and mechanical design temperature limits.

As shown in the schematic of FIG. 1, in particularly advantageous embodiments the regenerator 7, the $CO_2$ water wash section 9 and the ammonia stripper 20 are stacked one on top of the other forming a single column. This results in a particularly compact arrangement, wherewith footprint of the system 1 is reduced. Moreover, civil works, number of equipment, space requirement, water circulation systems (piping and pumps) are reduced with consequent advantages in terms of installation, running and maintenance costs.

By stacking the ammonia stripper 20 on top of the regenerator 7 and of the $CO_2$ water wash section 9, the condenser 51 of the ammonia stripper 20 will be positioned in a particularly high position. Using the high-hydraulic head pump 33 at the bottom of the direct contact cooler 3 to provide the chilling facility for the condenser 51 becomes therefore particularly beneficial.

In the currently preferred embodiment of FIG. 1, the above advantages are maximized by stacking also the direct contact heater, the ammonia water wash section 11 and the direct contact cooler 3. It shall however be understood, that stacking of ammonia stripper 20, $CO_2$ water wash section 9 and regenerator 7 and relevant beneficial effects can be foreseen irrespective of the mutual arrangement of the direct contact heater 13, direct contact cooler 3 and ammonia water wash section 11. For instance, in some embodiments, the direct contact cooler 3, the ammonia water wash section 11 and the direct contact heater 13 can be configured as three separate columns. Alternatively, two of these pieces of equipment, for instance direct contact cooler 3 and ammonia water wash section 11, or else the direct contact heater 13 and ammonia water wash section 11 can be stacked in a single column, while the third equipment is kept separate.

Moreover, advantages of mutual stacking of several equipment and sections as discussed above can be achieved also in combination with a different configuration of the condenser 51 on top of the ammonia stripper 20.

The beneficial effects of using water circulating between the direct contact cooler 3 and the direct contact heater 13 to condense water at the top of the ammonia stripper 20 can be achieved also in a system where the various sections and equipment are not stacked one on top of the other, or are stacked in a manner different from the one described so far and shown in FIG. 1.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A chilled ammonia-based carbon dioxide removal system comprising:
   a direct contact cooler adapted to receive and cool a flue gas containing gaseous carbon dioxide;
   a carbon dioxide absorber disposed downstream of and fluidly coupled to the direct contact cooler to receive the cooled flue gas from the direct contact cooler and to absorb the gaseous carbon dioxide from the flue gas via an ammonia-based CO2-lean solution to form an ammonia-based CO2-rich solution stream and a CO2-lean flue gas stream;

an ammonia water wash section fluidly coupled to the absorber and adapted to receive the CO2-lean flue gas stream from the carbon dioxide absorber and to absorb ammonia slip from the flue gas via a washing solution and form an ammonia-rich water stream;

a first stack comprising:

a regenerator fluidly coupled to the absorber and adapted to receive the ammonia-based CO2-rich solution stream from the carbon dioxide absorber, to release CO2 from the ammonia-based CO2-rich solution stream, and to return ammonia-based CO2-lean solution to the carbon dioxide absorber;

a CO2 water wash section adapted to receive gaseous carbon dioxide from the regenerator and absorb ammonia from the carbon dioxide stream via a washing solution and form an ammonia-rich water stream; and an ammonia stripper adapted to receive the ammonia-rich water stream from the CO2 water wash section and from the ammonia water wash section and to remove ammonia from the ammonia-rich water streams and to return ammonia to the carbon dioxide absorber and ammonia-lean washing solution to the CO2 water wash section and the ammonia water wash section; and a direct contact heater fluidly coupled to the ammonia water wash section and adapted to receive the ammonia-lean, CO2-lean flue gas from the ammonia water wash section, and to heat the flue gas prior to discharging the flue gas to atmosphere.

2. The system of claim 1, wherein the CO2 water wash section is disposed between the regenerator and the ammonia stripper.

3. The system of claim 1, further comprising:

a second stack comprising the direct contact cooler, the ammonia water wash section, and the direct contact heater.

4. The system of claim 1, further comprising:

a second stack comprising the direct contact cooler, the ammonia water wash section, and the direct contact heater, wherein the ammonia water wash section is disposed between the direct contact cooler and the direct contact heater.

5. The system of claim 1, further comprising:

a second stack comprising the direct contact heater.

6. The system of claim 1, further comprising:

a second stack comprising only the direct contact heater and the ammonia water wash section.

7. The system of claim 1, further comprising:

a second stack comprising only the ammonia water wash section and the direct contact cooler.

8. The system of claim 1, wherein the regenerator is at the bottom of the first stack.

9. The system of claim 1, wherein the ammonia stripper is at the top of the first stack.

10. The system of claim 1, wherein the carbon dioxide water wash is adjacent the regenerator in the first stack.

11. The system of claim 1, further comprising:

a pump coupled to the bottom of the direct contact cooler.

12. The system of claim 1, further comprising:

a pump coupled to the bottom of the direct contact cooler and to the top of the direct contact heater.

13. The system of claim 1, further comprising:

a water cooler in position to receive flow from the direct contact heater and direct flow to the direct contact cooler.

14. The system of claim 1, further comprising:

a first water cooler in position to receive flow from the direct contact heater; and a second water cooler in position to receive flow from the first water cooler and to direct flow to the direct contact cooler.

15. The system of claim 1, further comprising:

a heat exchanger coupled to receive flow from the bottom of the regenerator.

16. The system of claim 1, wherein the direct contact heater allows heat exchange between water and flue gas.

17. The system of claim 1, further comprising:

a condenser dispose at the top of the first stack.

18. The system of claim 1, further comprising:

a condenser dispose at the top of the first stack; and a line connecting the condenser to the top of the direct contact heater.

* * * * *